March 22, 1938. J. GRIESINGER 2,111,770
IRONING AND FOLDING MACHINE
Filed Feb. 16, 1934 10 Sheets-Sheet 1

Fig. 1.

Inventor
John Griesinger

By Bruno C. Lechler
Attorney

Patented Mar. 22, 1938

2,111,770

UNITED STATES PATENT OFFICE 2,111,770

IRONING AND FOLDING MACHINE

John Griesinger, Los Angeles, Calif., assignor, by mesne assignments, to American Machine and Metals, Inc., New York, N. Y., a corporation of Delaware Application February 16, 1934, Serial No. 711,513

25 Claims. (Cl. 38—10)

This invention relates to laundry machinery, and particularly to machines for ironing and folding flat work.

A broad object of the invention is to provide a machine for automatically ironing, drying and folding flat work.

Heretofore, to the best of my knowledge, all machine ironing of flat work in commercial laundries has been done on machines commonly termed "mangles" in which the piece to be ironed is passed between heated rolls. In the operation of mangles, it is customary for the operator to feed each piece in flat condition into the mangle by hand, then to fold the piece by hand either once or twice, and again feed it through the mangle after each folding operation. This method is disadvantageous for the reason that it is slow, is dangerous to the operator, and is expensive because of the large amount of labor necessary.

In accordance with the present invention, the above disadvantageous features of the customary commercial ironing process are eliminated by a single machine which automatically irons and folds flat work and delivers it in finished condition.

Other objects and features of the invention will be apparent from the following description of the machine, when read with reference to the accompanying drawings, in which.

Figures 2, 3, 4:
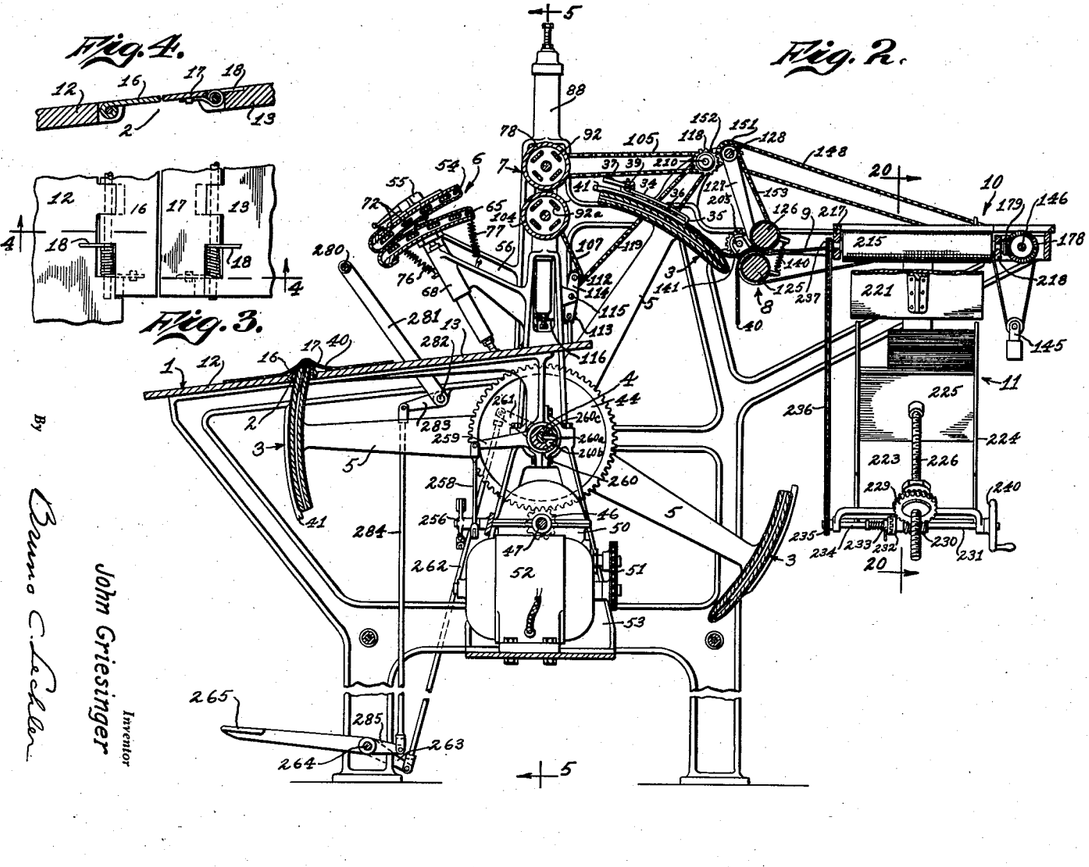
Figure 2 is a side elevational sectional view of the machine taken in the plane 2—2 of Figure 1.
Figure 3 is a detail view of a portion of the receiving table of the machine.
Figure 4 is a sectional view in the plane 4—4 of Figure 3.

Referring to Figure 2, my machine comprises a table 1, containing a lateral slot 2 through which a plurality of carrier elements 3 are positioned to revolve. Each carrier element 3 extends laterally beyond the width of the table and is rotatably secured to a central shaft 4 by spokes 5 which extend from the shaft 4 to the outer ends of each carrier 3.

A pair of ironing elements 6 and a pair of drying and pressing rolls 7 are positioned above the table 1 and in the path of the revolving carrier elements 3. A taking-off mechanism designated generally at 8, is positioned to the right of the rolls 7 in Figure 2, and is adapted to move in and out of the path of the carrier elements 3. Associated with the taking-off mechanism 8 are a plurality of belts 9 which serve to carry pieces being ironed from the taking-off mechanism 8 to a folding table designated generally at 10. A stacking mechanism indicated generally at 11, is positioned below the folding table 10.

The operation of the machine may be briefly outlined as follows: The carrier elements 3 are continually revolved by a motor mechanism in a clockwise direction (referring to Figure 2). During the interval between the passage of successive carrier elements 3 through the slot 2 in table 1, an operator places a piece to be ironed upon the table 1, so that the center of the piece lies over the slot 2. As the continuous rotation brings one of the carrier elements 3 through the table, the piece is lifted from the table by the carrier, the two portions of the piece falling back along the inner and outer surfaces, respectively, of the carrying element 3. As the carrier element continues to revolve, it carries the piece between the ironing elements 6 which simultaneously iron both sides of the piece as it passes therethrough.

After the carrier element 3 leaves the ironing element 6, the piece being ironed, tends to dry. It thereafter is carried between the drying rollers 7 which are heated and rotated in a direction opposite to the direction of travel of the carriers 3, so that the piece supported by the carrier is further dried and pressed as it passes between the rolls 7. After the carrier 3 has passed between rolls 7, it continues to revolve until it reaches the taking-off mechanism 8 which removes the piece from the carrier element 3 and feeds it between the rolls of the taking-off mechanism, onto the belt 9. Belt 9 takes a piece away from the rolls of the taking-off mechanism and deposits it on folding table 10 where it is folded and delivered as a completely processed piece to the stacking mechanism 11.

In order to give a complete understanding of the construction and operation of the machine, a detailed description of each separate element will now be given.

Receiving table

Figure 1:
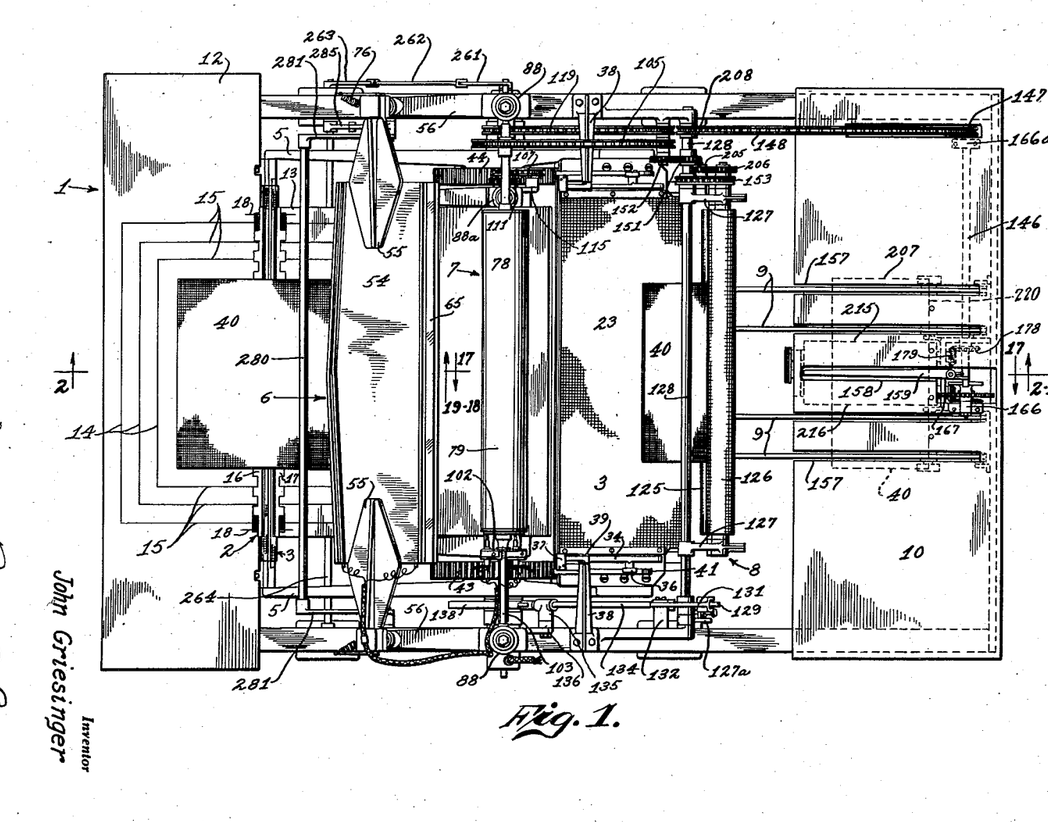
Figure 1 is a plan view of the machine.

Referring to Figure 1, the table 1 comprises a front section 12 and a rear section 13 separated by the slot 2. The front section 12 is relatively wide, extending substantially the full width of the machine but the rear section 13 is reduced in width to permit passage of the arms 5 supporting the carrier elements 3. Since the piece to be ironed is folded by the carrier element 3, as it is picked up by the latter, it is essential that the piece be properly centered on the table with respect to the slot 2.

For this purpose the table 1 is marked off by lines into rectangular fields. The lines 14—14 extending across both the front section 12 and the rear section 13 (the latter concealed from view in Figure 1) enable an operator to quickly locate a piece symmetrically over the slot 2. It is also essential that the piece to be ironed, be properly centered laterally on the table in order that it will be in proper position for the second folding operation to be described later. Parallel lines 15—15 enable the operator to quickly center the piece laterally on the table.

To prevent any possibility of the central portion of the piece to be ironed from sagging through the slot 2, the slot is closed by a pair of gates 16 and 17 as shown to best advantage in Figures 2, 3 and 4. The gate 16 is hinged to the edge of the front table 12, and the gate 17 is hinged to the edge of the rear table 13. Springs 18 serve to normally maintain the gates in flush position with the upper surface of the table, but permit the gates to be forced upward by the carriers 3 as the latter revolve through the slot 2.

In the operation of the machine, the carriers 3 are revolved at such a rate of speed as to permit a skilled operator to place and properly center a piece on the table 1 during the interval elapsing between the time one carrier leaves the table and the next one passes therethrough.

Construction and operation of the carrier elements

Figure 7:
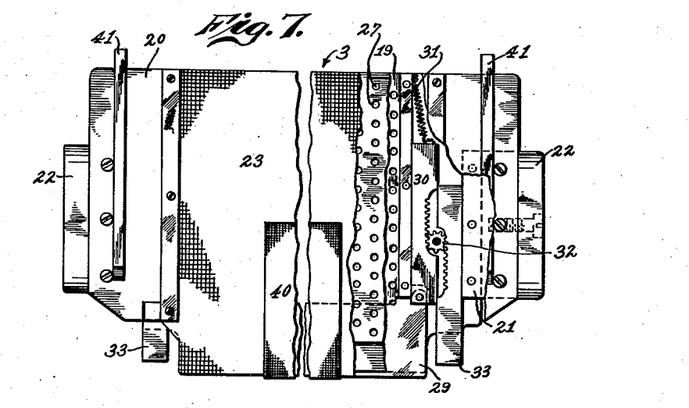
Figure 7 is a detail view of one of the carrier elements of the machine.
Figure 8:
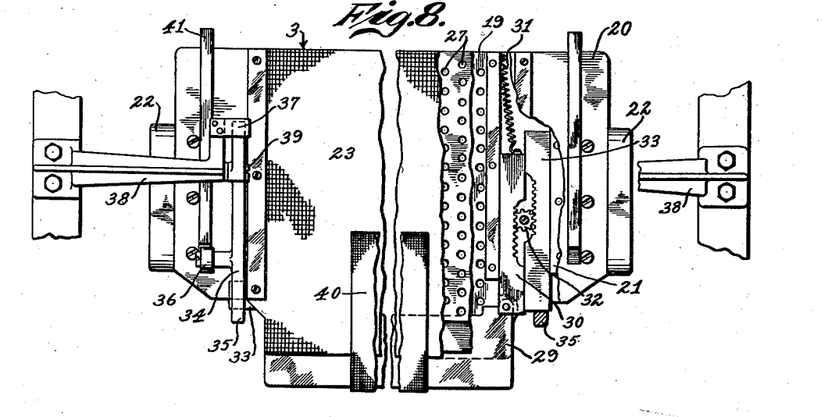
Figure 8 is a detail view similar to that of Figure 7, with the mechanism in a different position.
Figure 9:
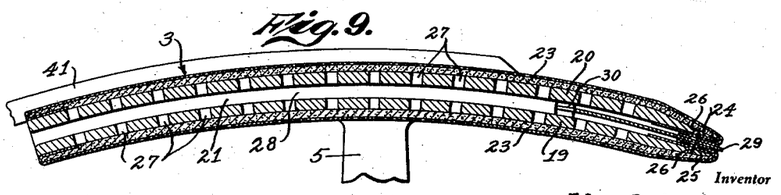
Figure 9 is a sectional view through one of the carrying elements.

Referring now to Figures 2, 7, 8 and 9, each carrier element 3 comprises an inner frame element 19 and an outer frame element 20 spaced apart therefrom. These frame members are preferably constructed of light metal and are supported in proper spaced relation from each other by side members 21, which in turn are secured by arms 22 to the ends of the arms 5 projecting radially from a central shaft 4. As shown in Figure 9, each frame member 19 and 20 is covered with padding 23 which extends over the forward tapered ends 24 and 25 of the frame members 20 and 19, and is secured on the inner side of these frame members by screws 26. Frame members 19 and 20 are preferably perforated by numerous apertures as indicated at 27, and the hollow space 28 between the frame members 19 and 20 is open at the rear end to permit the ready escape of steam from the pads 23.

Positioned between the frame members 19 and 20 at their forward edge, is a tongue 29 which extends back between the frame members a fractional portion of their total length, and the front edge of which is normally flush with the front edges of the frame members. The tongue 29 is attached at each end to a rack bar 30 positioned to slide forward and backward between the frame members 19 and 20. The rack bars 30 are normally retained in retracted position by springs 31. Each rack bar 30 is in mesh with a pinion 32 which is mounted to rotate about pins fixed with respect to the frame members 19 and 20.

The forward end of each rack bar 33 normally projects forward of the forward edges of the frame members 19 and 20, as shown in Figure 7.

Figure 17:
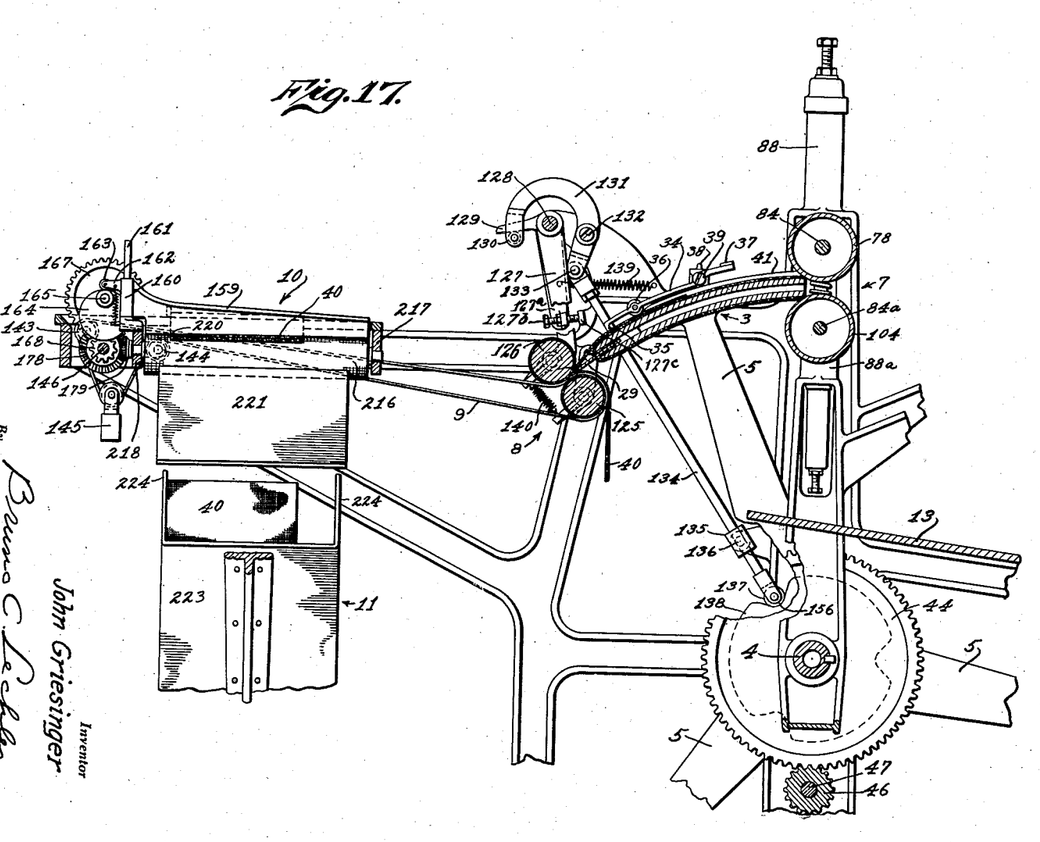
Figure 17 is a sectional elevational view of the taking-off mechanism in the plane 17—17 of Fig. 1.

Attached to the main framework of the machine (as shown to best advantage in Fig. 17) is a latch 34 which is pivoted to rotate about a pin 39. The rear end of latch 34 is shaped to form a catch 35, and a roller 36 is mounted on the latch between the catch 35 and the pivot 39. As shown in Figure 8, the roller 36 is offset slightly from the latch 34. A stop 37 secured to the arm 38 limits the downward motion of the rear end of the latch 34. As will be observed from Figure 8, the latch bars 34 are positioned to be directly over the rack bars 33, as the carrier rotates thereunder. The catches 35 on latches 34, therefore engage with the rack bars 33, thus preventing their continued revolution with the rest of the carrier 3. Rack bars 33 are therefore forced rearwardly with respect to the frame members 19 and 20 and the pinions 32, thereby rotating the pinions 32 in such a direction as to force the rack bars 30 forward, thus forcing the tongue 29 forward of the rest of the carrier as shown in Figure 8. This serves to break the piece 40 away from the pads 23 on the carrier, and facilitate the removal of the piece from the carrier by the taking-off mechanism to be described later.

Since the rearward movement of the rack bar 33 is limited, it is necessary to release the catch 35 on latch 34 from engagement with the rack bars 33 when the latter have moved rearwardly through the limit of their motion. For this purpose two cam guides 41 are secured on the top of the outer frame member 20 and positioned to align with the rolls 36 secured to latch bars 35. As shown in Fig. 9, the forward end of each cam 41 is tapered down to the upper surface of the frame member 20. The roll 36 is so positioned that it rides freely over the upper surface of frame member 20, but strikes the forward inclined end of cam 41 and is forced upward by the cam a sufficient distance to release the catch 35 on latch bars 34 from engagement with the rack bars 33. The catches 35 are therefore lifted clear of the rack bars 33, and are maintained out of contact with the carrier 3 by the cam 41 until the carrier 3 has passed beyond the catch 35.

Figure 5:
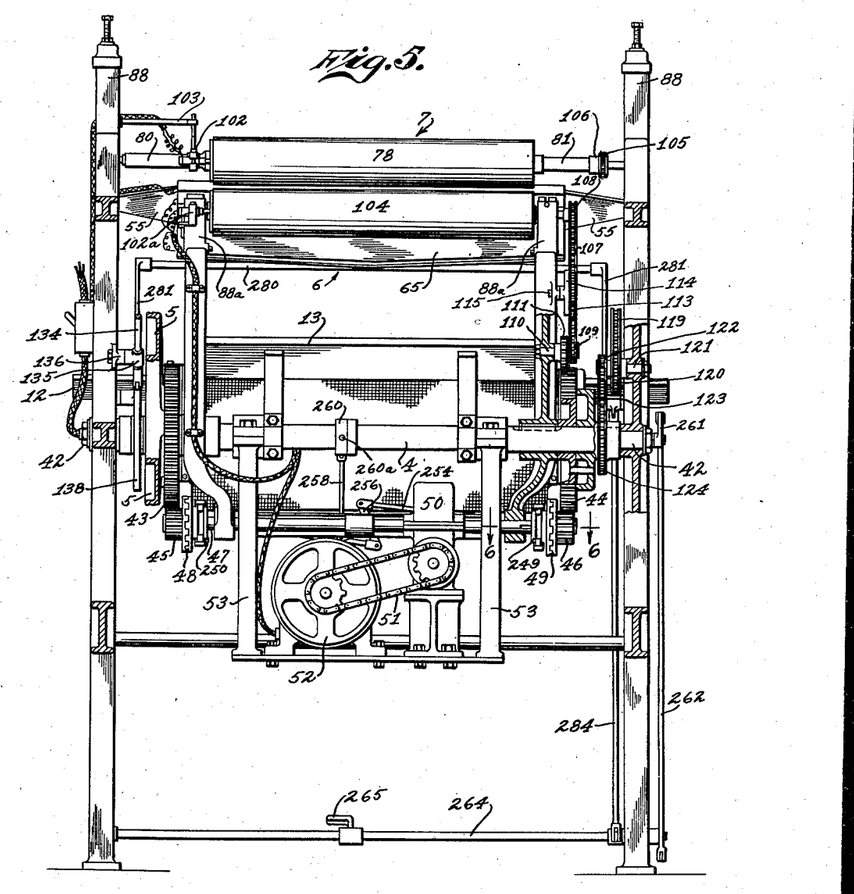
Figure 5 is an end elevational sectional view of the machine taken in the plane 5—5 of Figure 2.
Figure 6:
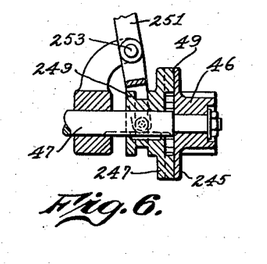
Figure 6 is a detail sectional view in the plane 6—6 of Figure 5, showing the clutch mechanism.

As previously indicated, the carrier members 3 are attached by spoke members 5 rotatable with respect to a central shaft 4. As shown in Figure 5 the shaft 4 is attached to the main frame of the device as indicated at 42, and carries two main drive wheels 43 and 44 which are rigidly attached to the spokes 5 and mesh with pinions 45 and 46 respectively, on a countershaft 47. Pinions 45 and 46 are rotatably connected to the countershaft 47 by clutch members 48 and 49, to be described later, and the countershaft 47 is continuously rotated through a gear reduction box 50 and a chain 51, by an electric motor 52, the latter being supported in a framework 53 suspended from the central shaft 4.

Ironing mechanism

Figure 10:
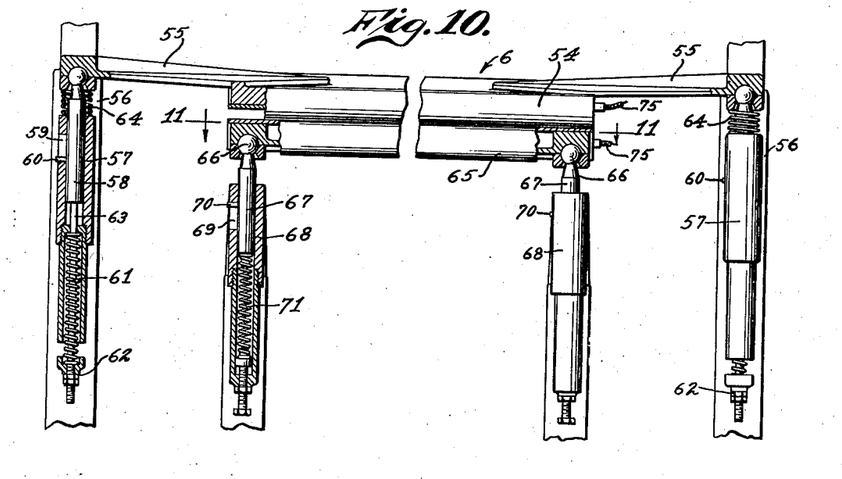
Figure 10 is a detail view showing the method of supporting the ironing elements of the machine.

The ironing elements, designated generally at 6 in Figure 2, comprise two juxtaposed elements having polished inner surfaces shaped to conform to the inner and outer surfaces respectively, of the carrier elements 3. Each element is independently flexibly supported as shown in Figure 10, thus the upper element 54 is supported by arms 55 which attach with ball and socket connections to supporting members 56. Attached to each support 56 is a guide 57 in which is fitted a sliding member 58. A slot 59 is provided in one side of member 57, and a pin 60 extending from each member 58, slides within the slot 59 and serves to limit the motion of member 58 in either the outward or inward direction. A spring 61 bearing between a nut 62 on the lower end of a rod 63 extending from member 58 and the lower end of guide 57, serves to flexibly resist upward motion of member 58 and the upper ironing element 54. A spring 64 positioned between the upper end of guide 57 and the lower end of arm 55, serves to counterbalance the weight of the upper ironing element 54 and to absorb the shock of the latter as it moves downward.

The lower ironing element 65 is also supported at each end through ball and socket connections 66 with members 67 mounted to slide within sleeves 68. Sleeves 68 are provided with slots 69 and pins 70 projecting from the members 67, serve to limit upward movement of the latter. Springs 71 serve to normally force the lower ironing element 65 outwardly against the carriers 3.

Figure 11:
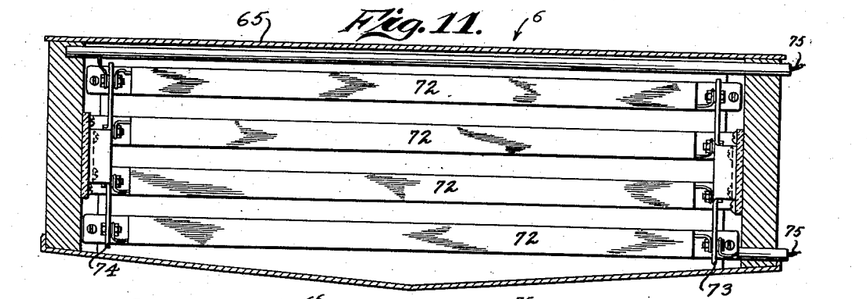
Figure 11 is a sectional view of the lower ironing element in the plane 11—11 of Figure 10.

Each ironing element 54 and 65 is heated and may be conveniently heated by electrical heating elements as disclosed in Figure 11. Thus Figure 11 discloses four heating elements 72 positioned immediately below the surface of the lower ironing element 65. These heating elements are shown connected in parallel between a bus bar 73 at one end, and a bus bar 74 at the other end. These bus bars are connected by leads 75 to any suitable source of energizing current.

Referring for the moment again to Figure 2, springs 76 are provided for normally drawing the forward end of the outer ironing element 54 inwardly and springs 77 are provided for normally drawing the rear end of the inner element 65 inwardly and correspondingly forcing the forward end of this element outwardly. It will be noted that by virtue of the ball and socket connections on elements 54 and 65, they can freely move into any position within certain limits.

With the ironing elements 54 and 65 positioned as shown in Figure 2, each carrier 3 after leaving the table 1, carries a piece 40 to be ironed between the forward edges of the elements 54 and 65, and since the forward edges of each of the elements 54 are normally forced together by the springs 76 and 77, the portion of the piece 40 closely adjacent the forward edge of the carrier 3, is thoroughly ironed.

As the carrier 3 continues its revolution and passes completely between the elements 54 and 65, the latter change their position to make uniform contact over the entire surfaces of the piece 40 and the carrier 3, thereby completely ironing the entire piece.

Figure 12:
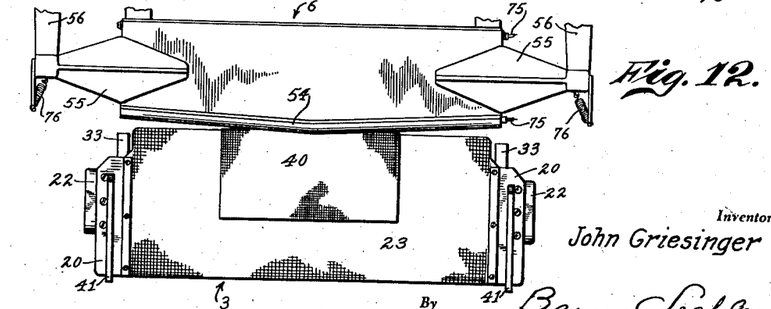
Figure 12 is a detail view showing one of the carrier elements entering the ironing elements.

As shown in Figures 11 and 12, the central portions of the ironing elements 54 and 65 are extended forward ahead of the outer portions of the edges. This slightly pointed central edge portion strikes the piece to be ironed first and tends to spread it laterally each way from the center, thus tending to insure the elimination of all wrinkles.

It is to be particularly noted that since the two ironing elements are independently and resiliently supported through ball and socket joints at each end, they at all times make smooth and uniform contact with the piece being ironed.

Finishing rolls

As previously described in connection with Figure 2, the piece being ironed, after leaving the ironing elements 6, is carried by one of the carriers 3 between finishing rolls 7.

Referring now to Figure 3 for a detailed description of the finishing rolls, an upper roll 78 comprises a cylindrical section 79 of metal having a smooth polished outer surface.

Figures 14, 15:
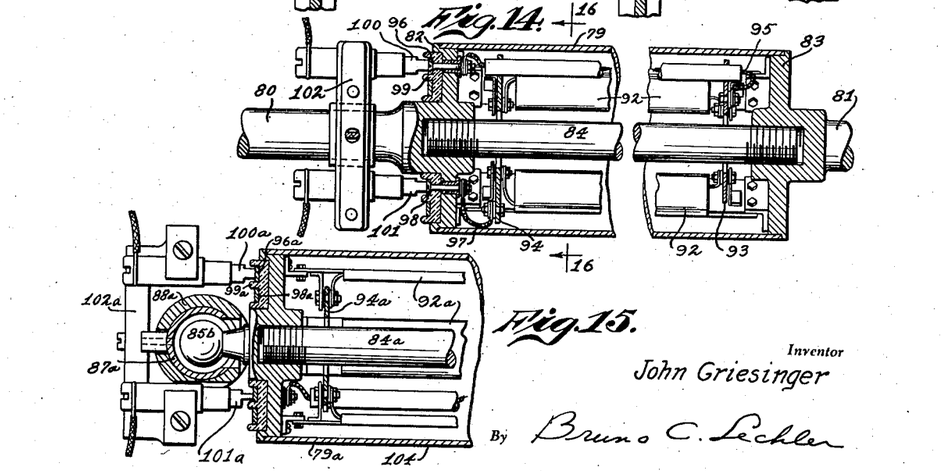
Figure 14 is a detail view partly in section in the plane 14—14 of Figure 13.
Figure 15 is a detail sectional view in the plane 15—15 of Figure 13.

As shown to better advantage in Figure 14, the cylindrical section 79 is supported at each end by shafts 80 and 81 respectively, which have flanges 82 and 83 extending outwardly to join with the ends of the cylindrical section 79. The two shafts 80 and 81 are joined rigidly together by a central shaft 84 the ends of which are threaded and screwed into the shafts 80 and 81 respectively.

The outer end of shaft 80 is formed into a ball 85 which is held between two socket members 86. Socket members 86 are threaded into a sleeve 87 which is slidable up and down within the frame 88. The socket members 86 are normally maintained in a predetermined position by means of an upper spring 89 and a lower spring 90 which permit shaft 14 to move up or down within relatively wide limits, although always tending to return it to a predetermined desired position. The mounting for the outer end of shaft 81 is in general similar to that of shaft 80, and corresponding parts have been given the same reference numerals. However, in this instance, the ball 85a instead of being formed integrally with the shaft 81, is a separate piece having a cylindrical opening therethrough. A reduced end section 91 of shaft 81, fits snugly within the cylindrical opening in the ball 85a and rotates therein. The construction described is advantageous since it permits one end of the roll to rise or fall independently of the other as the shaft end 91 is free to slide longitudinally within the ball 85a.

Although any known method may be employed for heating the finishing rolls, it has been found convenient to heat them electrically. Thus referring to Figures 14 and 15, each roll contains a plurality of electrically heated elements 92, each of which is connected to a bus bar 93 at one end of the roll and a bus bar 94 at the other end of the roll. The bus bar 93 is connected by an insulated lead 95 to a ring 96 at the left end of the roll, and bus bar 94 is connected by a lead 97 to a ring 98 concentric with but within the ring 96. Rings 96 and 98 are embedded in an insulating support 99 to prevent them from being short-circuited by the metal frame of the roll. Current is conducted to the rings 96 and 98 by brushes 100 and 101 which are supported in a holder 102 connected by an arm 103 to the frame member 88. The supporting member 102 is journalled to fit about shaft 80 and is partly supported thereby, but is prevented from returning therewith by the arm 103.

Current is supplied to the lower roll 104 in substantially the same manner as that described above in connection with the upper roll 78. However, as shown in Figure 15, it is not necessary to journal the brush support for this roll about the shaft of the roll, as the latter is very short. Thus, in this instance, the brushes 100a and 101a are supported directly from the member 87a which corresponds to the element 87 for supporting the upper roll 78.

Figures 13, 16:
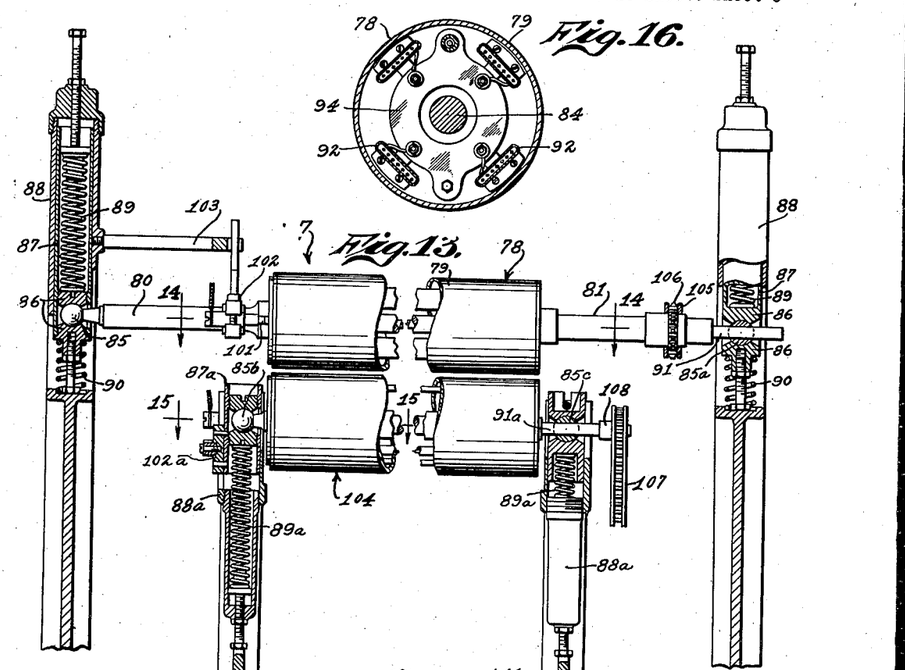
Figure 13 is a detail view partly in section showing the construction and method of supporting the drying and pressing rolls.
Figure 16 is a sectional view in the plane 16—16 of Figure 14.

It will be readily observed from Figure 13 that the method of supporting the lower roll 104 is substantially the same as that employed for supporting the upper roll 78. The only differences are that the supports 88a for the lower roll are positioned very close to the end of the roll in order to permit passage of the carrier elements supporting arms 5, and the springs corresponding to springs 90 on the upper roll are eliminated. No such springs are necessary on the lower roll since the weight of the roll maintains it against springs 89a.

The rolls are continuously driven in opposite directions so as to thoroughly iron the piece passing therethrough. The upper roll 78 is rotated through a chain 105 engaging with a sprocket 106 mounted on shaft 81; and the lower roll 104 is driven by a chain 107 engaging with a sprocket 108 on the shaft of the lower roll. Referring to Figure 5, the chain 107 engaging with the sprocket 108 on the lower roll is driven by a sprocket 109 which is mounted on a shaft 110 with a pinion 111 which meshes with and is driven by the large gear 44 on shaft 4. Since the lower roll 104 moves up and down as the carrier elements 3 pass thereover, means must be provided to take up slack in the chain 107 when the roll 104 is pressed downward. To take up this slack a pair of sprockets 112 and 113 respectively (referring to Figure 19) are mounted on a rocker arm 114 pivoted to rotate through an arc about a pivot means 115.

A spring 116 is provided which tends to rotate the rocker arm 114 in such a direction as to force its upper end outward and its lower end inward. The chain 107 passes outwardly around the upper sprocket 112 and inwardly about the lower sprocket 113 so that the chain is always maintained in taut condition by the spring 116.

The chain 105 meshing with the sprocket 106 on the shaft of the upper roll, extends horizontally and engages with a sprocket 117 which is mounted on a common shaft with another sprocket 118 which is driven by a chain 119 from a sprocket 120 rotatably mounted on a shaft 121. A second sprocket 122 is mounted on shaft 121, and is secured rigidly to the shaft and to sprocket 120, and is rotated by a chain 123 passing around a sprocket 124 on the main shaft 4. It will be apparent from inspection of Figure 19, that since the motion of the upper roll 78 is vertical, the length of chain 105 is not materially altered by the motion of the roll, and therefore no special arrangement for taking up slack in chain 105 need be provided.

By means of the apparatus described, the upper and lower rolls 78 and 104 respectively, are continuously rotated in a direction opposite to the movement of the carrier elements 3 therebetween. The rolls intimately follow the carrier elements 3 and the pieces to be ironed supported thereon, by virtue of the spring supported ball and socket mountings which permit either end of each roll to move up or down as may be necessary to make perfect contact with the piece being ironed.

*Taking-off mechanism*

As has been previously outlined, after the carrier 3 has passed between the rolls 7, the piece being ironed is removed from the carrier 3 by the take-off mechanism 8. The operation of this mechanism will now be described in detail.

Figure 19:
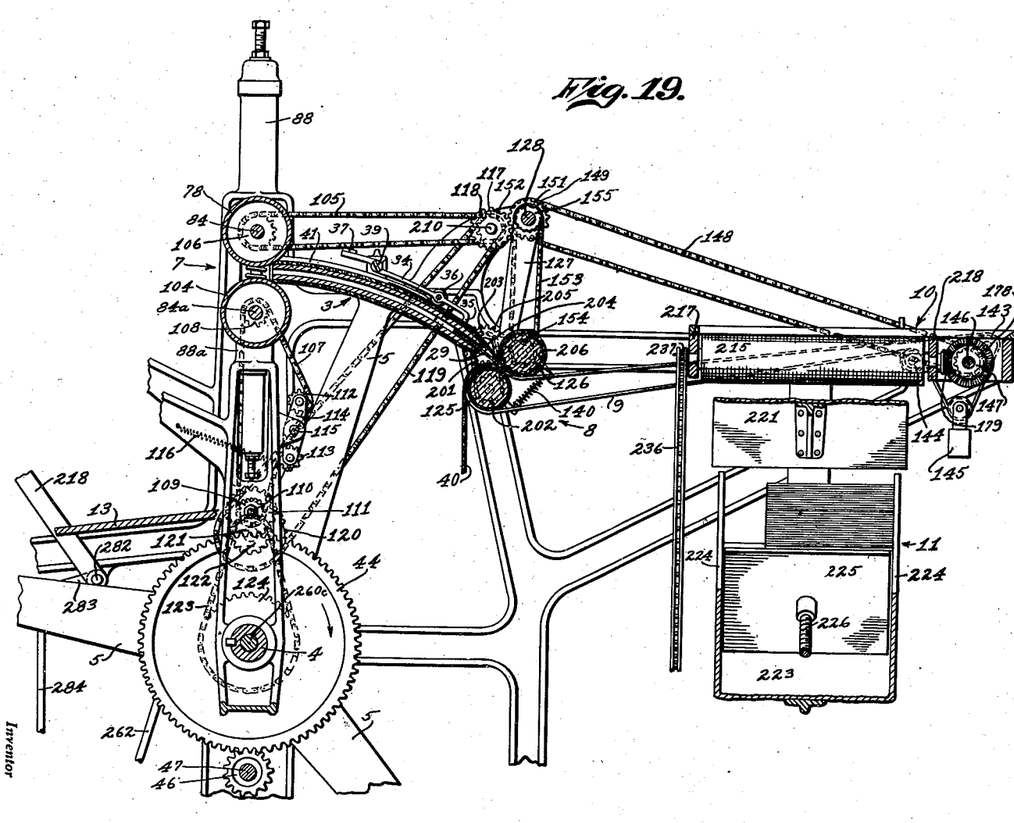
Figure 19 is a sectional elevational view of the taking-off mechanism in still another phase of its cycle of operation, taken in the plane 19—19 of Figure 1.

As pointed out in the description of the carrier mechanism 3, the tongue 29 in the forward edge of each carrier, is automatically thrown forward to strip the piece 40 loose as the carrier reaches the position shown in Figure 19. Thus this figure shows the tongue extended and projecting the piece.

Figure 18:
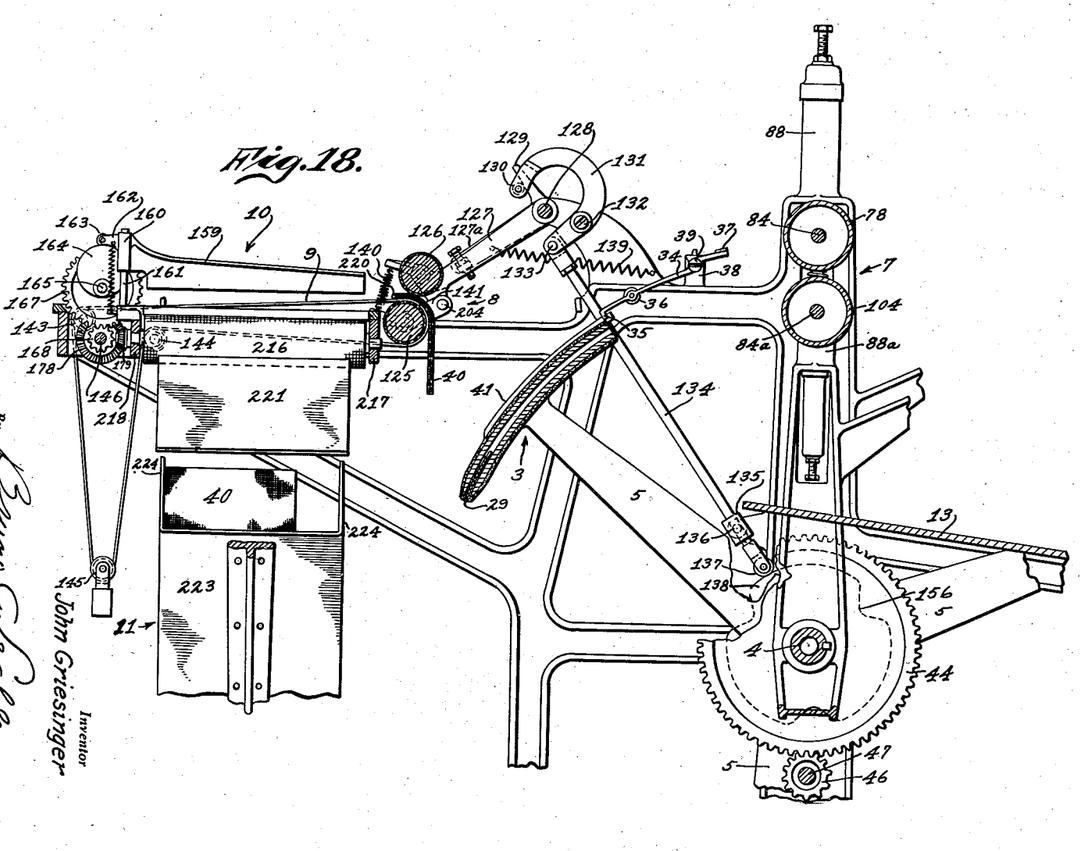
Figure 18 is a sectional elevational view of the taking-off mechanism in the plane 18—18 of Figure 1, with the apparatus in a different phase of its cycle of operation.

Referring now to Figure 18, the take-off mechanism comprises two rolls 125 and 126 respectively, mounted on arms 127 which are pivoted to the main frame of the machine by a shaft 128. An arm 129 projects outwardly from one of the arms 127 and engages with a roll 130 secured to the upper end of a curved lever 131 which is rotatably mounted to swing about a pin 132 as a pivot, and has its other end secured by a pin 133 to a push rod 134. The lower end of the push rod 134 is slidably mounted in a guide 135, which in turn is pivoted at 136 to the frame of the machine whereby the lower end of the rod may move freely in a radial direction with respect to the shaft 4, but is restrained from tangential motion thereto. The lower end of rod 134 is provided with a roll 137 which bears against a cam 138 mounted to rotate on shaft 4.

The weight of rolls 125 and 126 tends to maintain the arm 129 in contact with the roll 130 to force the rod 134 toward the cam 138 at all times. However, to futher insure that the parts described will follow the cam 138 at all times, a spring 139 is provided between an arm 127a on the outer end of shaft 128 and the main frame of the machine.

The rolls 125 and 126 are normally maintained in contact with each other by a spring 140, the lower roll 125 being mounted on an arm 141 pivoted to the arm 127.

The upper roll 126 is maintained in rotation by a chain 153 meshing with a sprocket 154 on the end of roll 126, and with a sprocket 155 on shaft 128. There is also mounted on shaft 128 a gear wheel 151 which meshes with and is rotated by a gear wheel 152 mounted on the same shaft with, and rotated by, sprocket 118 which is driven by chain 119. The mechanism described serves to constantly rotate the upper roll 126 in a counter-clockwise direction when looking in the direction of Figure 19. The lower roll 125 is also positively driven by a chain 201 (referring now to Figure 19) which couples a sprocket 202 on the end of roll 125 with a sprocket 203 mounted on a shaft 204 about which roll 125 is positioned to revolve on arms 141.

Attached to sprocket 203 on shaft 204 is a gear wheel 205 which meshes with and is rotated by a gear wheel 206 mounted on the end of roll 126. The mechanism described serves to positively rotate rolls 125 and 126 in opposite directions, regardless of whether or not these rolls are lying closely adjacent each other or are separated by the passage of a thick piece of cloth therebetween.

For supporting the piece being ironed after it leaves the rolls 125 and 126, belts 9 are provided which pass around the lower roll 125 over a plurality of rolls 143 and 144 respectively, and are maintained in taut condition regardless of the position of rolls 125 and 126 by weighted pulleys 145.

It will be observed from the foregoing description, that rolls 125 and 126 are continuously rotated in a direction to carry the upper sides of the belts 9 away from the rolls.

Referring now to Fig. 18, it will be observed that the rolls 125 and 126 are normally maintained in the position shown by the rod 134 resting against the outwardly extending portion of the cam surface 138. However, at the moment the carrier 3 approaches the position shown in Fig. 19, the cam 138 rotates to permit the roll 137 to drop into one of the three depressions 156, which permits the arm 127 and the rolls 125 and 126 to be moved by their weight and the force of spring 139 into a position immediately in front of the carrier 3 as shown in Fig. 19.

Thus, referring to Fig. 19, the rolls 125 and 126 are positioned so that the tongue 29 of the carrier 3 has forced the piece 40 almost into contact with the surfaces of the rolls. It will also be observed in Fig. 19 that the roll 36 on the latch 34 is just about to engage with the cam surface 41. Therefore, as the carrier 3 moves a half an inch or so from its position in Fig. 19, the roll 36 will ride up on cam 41 to trip the hooked end 35 of the latch 34 out of engagement with the rack bars 33, thus permitting the tongue 29 to be retracted by springs 31 before the tongue actually touches the rolls 125 and 126. However, the forward edge of the piece 40 still extends forwardly of the carrier 3 so that as the carrier 3 continues to revolve, the forward edge of the piece 40 is seized by and drawn between the rolls 125 and 126. At this stage of the operation the rotation of cam 138 (referring for the moment to Fig. 18) lifts the rolls 137 and the push rod 134 to swing the arm 127 and the rolls 125 and 126 out of the path of the carrier 3 into the position shown in Fig. 2. Thus, referring to Fig. 2, the lower roll 125 has moved clear of the carrier 3 and the lower half of the piece 40 has dropped away from the carrier 3, although the upper half is still resting on the top of carrier 3. In Fig. 18 the roll 137 and push rod 134 have been forced into their normal position by the cam 138 carrying the arm 127 and the rolls 125 and 126 well away from the carrier 3, and the piece 40 is shown passing between the rolls 125 and 126 but with its rear ends depending downward therefrom.

To accurately limit the movement of rolls 125 and 126 into the path of the carriers 3, an arm 127a is provided on the outer end of shaft 128 (referring to Figs. 1 and 17) and a screw 127b threaded into the end of arm 127a contacts with a stop plate 127e on the frame of the machine. By turning screw 127b in or out the extent of travel of the rolls 125 and 126 toward the carriers 3 may be accurately controlled.

The continued rotation of rolls 125 and 126 carries the piece 40 completely therethrough, and the piece is then conveyed by belts 9 to a position over the folding table 10. The rate of rotation of rolls 125 and 126 is so regulated with respect to the speed of rotation of the cam 138 that the piece 40 is carried to a desired position over the folding table 10 at the time the next depression 156 in cam 138 moves under roll 137. The arm 127 together with rolls 125 and 126 is then swung downward into the position shown in Fig. 19, in which position the upper sides of belts 9 are carried through slots 157 in the table 10 below the upper surface of the table, thus depositing the piece 40 upon the table top.

Folding mechanism

Referring for the moment to Fig. 1, the folding table 10 is provided with a longitudinal slot 158 extending therethrough. This slot is positioned midway between the sides of table 10 and if the piece is properly centered on the receiving table 12 it will be deposited symmetrically with respect to the slot 158 in table 10, as shown by the dotted lines 207.

Referring now to Fig. 18, a folding bar 159 is positioned to move up and down from a position above the table 10 to a position therebelow through the slot 158. The bar 159 is provided with a shoulder 160 which extends vertically and has a passage extending therethrough. A guide 161 which is rigidly attached to the framework of the machine fits within the vertical opening in shoulder 160 and guides the bar 159 in its movement up and down. Extending rearwardly from the shoulder 160 is an arm 162 carrying a roller 163 which bears against the edge of an eccentric plate 164 secured to a shaft 165. Shaft 165 is rotatably mounted in a journal 166 (referring for the moment to Fig. 1) and carries a gear wheel 167 which meshes with a pinion 168 on a shaft 146. Shaft 146 (as shown in Fig. 1) is journalled in bearings 166a secured to the main frame of the machine and carries at its outer end a sprocket wheel 147 which is driven through a chain 148 from a sprocket wheel 208 on shaft 128. As has been previously outlined, shaft 128 is continuously driven through gears 151 and 152 from shaft 210 which is continuously rotated by chain 119.

The eccentric plate 164 being continuously rotated, as outlined, alternately lifts the folder bar 159 and lowers it, and is so synchronized with the rest of the mechanism as to lower bar 159 just after the belts 9 have deposited a piece to be folded onto the table 10. As it is lowered into the position shown in Fig. 17, the bar 159 creases the center of the piece on the table and forces it down through the slot 158.

Figures 20, 21, 22:
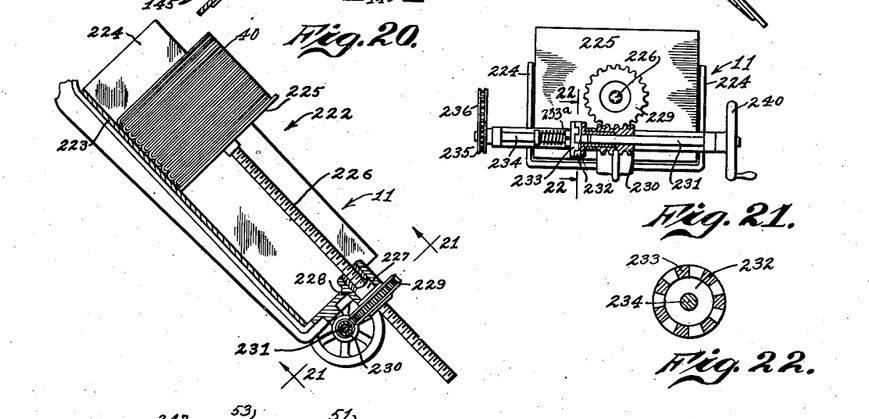
Figure 20 is a sectional elevational view of the folding and stacking mechanism taken in the plane 20—20 of Figure 2.
Figure 21 is a sectional detail view of the stacking mechanism taken in the plane 21—21 of Figure 25.
Figure 22 is a detail section of the clutch mechanism in the plane 22—22 of Figure 21.
Figure 23:
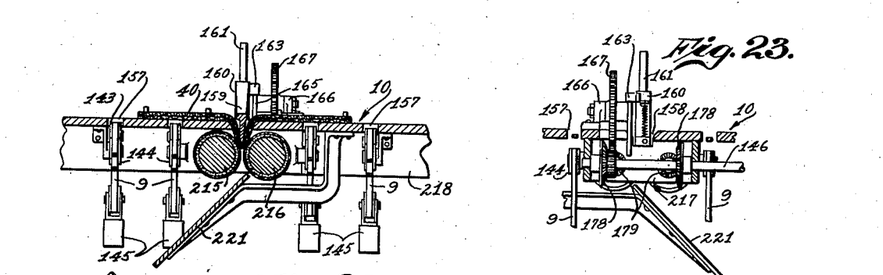
Figure 23 is a detail view partly in section of the folding and stacking mechanism.

Mounted immediately below the table 10 and extending longitudinally on either side of slot 158 are two rolls 215 and 216. The positions of these rolls are best shown in Fig. 20, and the way in which they are mounted in Fig. 17. Thus, each roll is mounted on a shaft extending therethrough and projecting from the ends into bearing plates 217 and 218 attached to the main frame of the machine. These shafts extend through the rear bearing plate 218 and have mounted on their ends bevel pinions 179 (referring for the moment to Fig. 23) which mesh with bevel gears 178 mounted on shaft 146. Rolls 215 and 216 are, therefore, continuously rotating in opposite directions, roll 215 rotating in a clockwise direction and roll 216 rotating in a counter-clockwise direction, as disclosed in Fig. 20, so that they seize the fold in the piece to be folded as it is forced between them by bar 159.

The rolls 215 and 216 are heavily padded with resilient material so that although they are normally in contact with each other they readily compress to permit the passage of the piece to be folded therethrough. They, therefore, seize the creased cloth as it is forced in contact with them by the bar 159, and draw it therebetween off of table 10 through slot 158.

Referring now to Fig. 1, it will be observed that a flat piece of goods spread out on the receiving table 1 in properly centered relation will be initially folded when it is lifted by the carrier element 3 and carried through the ironing element 6, the drying and pressing rolls 7 and the taking-off mechanism 8. Therefore, when the piece is deposited on the folding table 10, it has already been folded once with its folded edge at 220, as shown in Fig. 1. Therefore, when the center of the piece is forced down by bar 159 and the piece is drawn through the folding rolls 215 and 216, it is folded a second time at right angles to the original fold.

Stacking mechanism

As the twice-folded piece passes out below rolls 215 and 216 (referring now to Fig. 20), it falls upon a guide plate 221 which is set at substantially a 45° angle. When the piece has passed entirely through the rolls 215 and 216 it, therefore, slides down along plate 221 and comes to rest in a receiver designated generally at 222 which comprises a wall 223, guides 224 and a movable bottom plate 225. Bottom plate 225 is positioned substantially at right angles to the wall 223 and is adapted to slide therealong. It is supported by a threaded shaft 226 which is threaded within a nut 227 journalled to rotate in a bearing 228. Nut 227 has attached thereto a worm wheel 229 which meshes with a worm 230 (referring now to Fig. 21) on a shaft 231. Shaft 231 carries on one end a clutch member 232 adapted to engage with a clutch member 233 on the end of a second shaft 234 aligned with shaft 231. A sprocket 235 is mounted on the outer end of shaft 234 and is continuously driven by a chain 236 from a sprocket 237 on the end of roll 215. The gear reduction between the nut 227 and the rest of the mechanism is such as to shift the bottom plate 225 a distance equal to the thickness of a folded piece each time a piece is delivered from rolls 215 and 216, thus tending to maintain the top of the stack of folded pieces on plate 225 just below the lower edge of the guide plate 221.

When the bottom plate 225 has been driven down as far as it will go, the stack of folded pieces is removed manually, and it is then necessary to return the plate 225 to its upper position. This is accomplished by releasing the clutch member 233 from engagement with clutch member 232 and rotating the shaft 231 by means of a hand wheel 240 in the opposite direction, thus rotating the screw 226 in such a direction as to move plate 225 into its upper position. Clutch member 233 is provided with a pin 233a extending therefrom, whereby it may be manually restrained out of engagement with clutch member 232.

Safety clutch control

As has been previously indicated, an operator places and centers pieces 40 on the receiving table 1 during the time between the passage of successive carriers 3 through the table. Ordinarily, the operator will have no difficulty in properly placing and centering the pieces without halting the operation of the machine. However, it is possible that occasionally she may not succeed in centering the piece before the next carrier element 3 enters the slot 2 in the table. It is, therefore, desirable to provide a speedy method of stopping the operation of the entire mechanism.

As is previously described in connection with the operation of the carrier elements, the gear wheels 43 and 44, which directly or indirectly drive all the rest of the mechanism, are rotated by pinions 45 and 46 which are connected by clutches 48 and 49, respectively, to the shaft 47 which is continuously driven from the motor 52.

Figure 24:
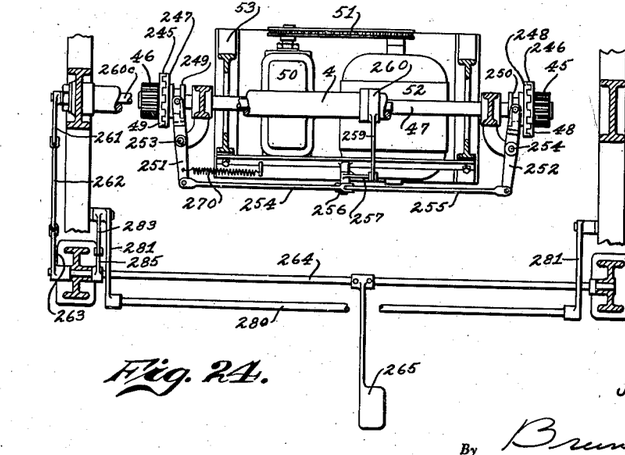
Figure 24 is a detail view of a portion of the safety clutch mechanism.

Referring now to Fig. 24, the pinions 45 and 46 are mounted to rotate loosely upon the ends of shaft 47, and are rigidly connected to respective clutch members 245 and 246. Cooperating clutch members 247 and 248, respectively, are keyed to rotate with shaft 47, but are slidable longitudinally therealong. They have attached thereto channeled collars 249 and 250, respectively. A pair of lever arms 251 and 252, respectively, are pivoted to the main frame at 253 and 254, respectively, and carry at their inner ends pins which engage in the channels in the collars 249 and 250, respectively. The outer ends of the levers 251 and 252 are connected by rods 254 and 255, respectively, to the upper and lower ends, respectively, of a lever arm 256 which is pivoted to rotate in a vertical plane about a pin through its center which serves as a fulcrum. Rigidly attached to lever arm 256 to turn therewith is a laterally extending arm 257 which is connected at its outer end by a rod 258 (referring to Fig. 5) to the outer end by a rod 259 attached by a hub 260 to a shaft 260c positioned within hollow shaft 4. A second arm 261 is attached rigidly to shaft 260c at its extremity where it projects beyond shaft 4. A rod 262 connects the outer end of arm 261 to the outer end of an arm 263 connected rigidly to a shaft 264 extending between the side frame members of the machine. A pedal 265 is rigidly attached to shaft 264 substantially at its center. It is to be noted that it is necessary to couple the pedal 265 to lever arm 257 through the central shaft 260c to avoid obstructing the path of the carrier elements 3 and their supporting spokes 5.

It will be seen by reference to Fig. 24 that the outer ends of arms 251 and 252 are normally maintained in inward position by a spring 270, thus maintaining the clutch members 247 and 248 in engagement with clutch members 245 and 246, respectively, so that shaft 47 drives the pinions 45 and 46 and maintains the entire machine in operation.

If the operator wishes for any reason to suddenly stop the machine, she places her foot on pedal 265 and presses it downwardly, thus rotating shaft 264 and moving the outer end of arm 263 upwards. This raises shaft 262 which moves the outer end of arm 261 upwards, turns shaft 260c and raises the outer end of arm 259 which raises rod 258, which in turn raises the outer end of arm 257 and rotates the lever 256 in such a direction as to force rods 254 and 255 outwardly, thus moving collars 249 and 250 and their attached clutch members 247 and 248, respectively, inwardly out of engagement with the clutch members 245 and 246, respectively, thus stopping the machine.

The carrier elements 3 are carried upward from the receiving table 1 toward the ironing elements 6 with considerable force. If the operator should accidentally get a hand or arm caught between the forward edge of the carrier 3 and the entering edge of the ironing elements 6, she might suffer serious injury, particularly since the ironing elements 6 are heated. It is, therefore, desirable to provide special protective equipment to stop the machine in case the operator should have her hand or arm over the top of the carrier 3 as it approaches the ironing elements 6. This safety means comprises a bar 280 (referring for the moment to Fig. 1) extending entirely across the front of the machine a short distance in front of the ironing elements 6 and just above the path of the carrier elements 3. Bar 280 is supported at each end by arms 281 to a shaft 282; and shaft 282, which is journalled in bearings in the main frame, has extending forwardly therefrom an arm 283, the outer end of which is connected by a rod 284 to an arm 285 extending rearwardly from the shaft 264.

Should the operator have her hand or arm resting on top of a carrier 3 as it moves from the table 1 toward the ironing elements 6, her hand or arm will necessarily come in contact with the rod 280 and force it upwardly, thus rotating shaft 282 and arm 283 to lift rod 284 and rotate arm 285 and shaft 264. The rotation of shaft 264 disengages the clutches 247 and 248 as previously outlined, and stops the machine before the carrier 3 can force the operator's arm or hand into contact with the hot ironing elements 6.

Conclusion

Although for the purpose of clarity the operation of different portions of the machine have been described separately, it is to be understood that the success of the machine depends upon the synchronous operation of all the elements in synchronous relation. Thus, the take-off mechanism 8 swings in front of the carrier 3 just as the tongue 29 of the carrier has shifted the piece on the carrier forwardly therefrom and is released to move back within the carrier. The taking-off rolls 8 then move out of the path of the carrier 3 in time to permit the latter to continue its uninterrupted revolution.

The belts 9 then carry the piece away from the taking-off rolls 125 and 126 and deposit it on the folding table 10 by the time the next succeeding carrier 3 is in position to be stripped. The folding bar 159 then creases the piece on table 10 and forces it into engagement with the folding rolls 215 and 216 before the belts 9 rise into position above the table 10, and the folding rolls 215 and 216 remove the piece from the table 10 before the next piece is deposited by belts 9.

The machine described is capable of handling any flat laundry work of dimensions small enough to pass through the machine, and is particularly designed and adapted to iron and fold small rectangular pieces such as handkerchiefs, napkins, etc. However, although the machine particularly described is primarily intended for ironing small pieces of laundry, certain novel features of it will also be useful in processing sheets of material other than cloth; and I do not wish to be limited to the handling of cloth articles. Therefore, where the expression "sheet" is used in the claims, it is intended to cover any thin material including articles of fabric or any other material.

I claim:

1. In an ironing machine adapted to iron rectangular pieces of fabric without drawing them out of square, in combination, a receiving table having a slot, a carrier adapted to pass upwardly thru the slot picking up the fabric on a median line thus dividing the fabric into two equal portions, ironing means symmetrically placed against which the carrier brushes, so that the stretch created by the drag of the ironing means will draw the two opposite portions of the fabric out of shape by an equal amount.

2. In a machine of the type disclosed in combination, a table for supporting a sheet, a slot in said table, a gate for closing said slot hinged to open upwardly, means for processing said sheet, and means movable through said slot for picking said sheet from said table and carrying it through said processing means.

3. In a machine of the type disclosed, in combination, a table for supporting a sheet; a plurality of parallel lines on said table for centering said sheet thereon, means for processing said sheet; and movable sheet supporting means for picking said sheet from said table and carrying it thru said processing means, said sheet supporting means having an edge parallel to the table top which picks up the sheet, the ends of the sheet depending on opposite sides of said edge, and faces for supporting the two dependent ends of the sheet.

4. A machine as described in claim 1, characterized in that said table is marked with a plurality of parallel lines for centering said sheet with respect to said slot.

5. In a machine of the type described, in combination, processing means for a sheet, a carrier adapted to support said sheet, means for moving said carrier in one direction along a closed path past said processing means, the carrier having a leading edge normal to the closed path and flat sides receding from the leading edge, adapted to support during processing the entire surface of the sheet folded over the leading edge.

6. In a machine of the type described, a hollow carrier member, a plurality of perforations extending from the interior of said member to the exterior thereof, pads attached to the exterior of said hollow member, a pair of heated elements for processing said sheet, and means for moving said carrier member between said heated elements.

7. In a machine of the type described, in combination, a pair of processing means for a sheet, a carrier adapted to support said sheet, means for moving said carrier in one direction along a circular path between said processing means, the carrier having a leading edge normal to the circular path and flat sides receding from the leading edge, adapted to support during processing the entire surface of the sheet folded over the leading edge.

8. In a machine of the type disclosed, a relatively thin carrier member having substantially parallel faces, a slot in the front edge of said member, a tongue in said slot, and means for projecting said tongue from said slot to strip a sheet from said carrier.

9. In a machine of the type disclosed, a relatively thin carrier member for supporting a sheet folded thereover, said carrier member having substantially parallel faces, a slot in the front edge of said carrier member, a tongue in said slot, a mechanism in said carrier for projecting said tongue from said slot, and means engageable with said carrier at a predetermined point in its travel for actuating said mechanism.

10. In a machine of the type described, in combination, a pair of heated irons having plane faces, a carrier adapted to support a sheet, means for moving said carrier in one direction between said heated irons, the carrier having a leading edge normal to the direction of movement and flat sides receding from the leading edge, adapted to support during ironing the entire surface of the sheet folded over the leading edge.

11. In a machine of the type disclosed, a carrier member for supporting a sheet folded thereover, said carrier element having a tapered leading edge and substantially parallel faces back of said tapered edge, a pair of irons having opposed surfaces shaped to correspond with respective faces of said carrier and having rounded forward edges, means for moving said carrier between said irons, and means for resiliently forcing the forward edges of said irons toward each other whereby said edges of said irons contact with the portions of said sheet immediately adjacent the leading edge of said carrier.

12. In a machine of the type disclosed, a carrier member having substantially parallel faces for supporting a sheet folded thereover, a pair of irons for processing said sheet, means for passing said carrier member between said irons, the opposed surfaces of said irons being shaped to correspond with the respective faces of said carrier member, and the edges of said irons which are first contacted by the carrier being extended at the center ahead of the rest of the irons whereby said sheet is ironed from the center outwardly.

13. In a machine of the type disclosed, a carrier member for supporting a sheet folded thereover, a pair of ironing elements for processing said sheet, rolls for processing said sheet, and means for moving said carrier member successively between said ironing elements and said rolls.

14. Means as described in claim 13, with means for rotating said rolls so that the linear surface speed of the rolls differs from the speed of said carrier.

15. Means as described in claim 13, in which said rolls are rotated so that the roll surface moves in a direction opposite to that of said carrier.

16. Means as described in claim 13 in which said rolls are heated.

17. In a machine of the type disclosed, a carrier for carrying a sheet folded back over the front edge thereof, means for moving said carrier through a predetermined path, a pair of contacting rolls, means for shifting said rolls into the path of said carrier, means for projecting the folded edge of said sheet away from the front edge of said carrier whereby said sheet is seized between said rolls, and means for thereafter shifting said rolls out of the path of said carrier.

18. In a machine of the type disclosed, a revoluble carrier for carrying a sheet folded back over the front edge thereof, means for revolving said carrier through a circular path, a pair of contacting rolls, means for shifting said rolls into the path of said carrier to seize the folded edge of said sheet projecting from the front edge of said carrier and for thereafter shifting said rolls out of the path of said carrier.

19. In a machine of the type disclosed, a carrier for carrying a sheet folded back over the front edge thereof, means for moving said carrier through a predetermined path, a pair of contacting rolls positioned one above the other, means for rotating said rolls, means for shifting said rolls into the path of said carrier, means for projecting the folded edge of said sheet away from the front edge of said carrier whereby said sheet is seized between said rolls, means for thereafter shifting said rolls out of the path of said carrier, and a belt about said lower roll extending substantially horizontally therefrom for supporting said sheet after it leaves said rolls, and means for maintaining said belt taut.

20. In a machine of the type disclosed, a plurality of carrier belts, means for delivering a sheet to said carrier belts, a table below said belts, slots in said table, means for moving the upper portions of said belts toward said table to carry a sheet to a position above said table, and means for lowering said belts through said slots thereby depositing said sheet on said table.

21. In an ironing machine, in combination, a feeding table, ironing means located above the table, power operated means controlled by a clutch for carrying the work from the feeding table up to the ironing means, a bar positioned slightly in front of the path of the carrying means and above the normal level for loading the table, and clutch releasing means actuated by the bar if the operator's hand is carried up toward the ironing means with the work.

22. In a machine of the type disclosed in combination, a table for supporting a sheet to be processed, means for ironing said sheet, means for drying said sheet, carrier means for lifting said sheet from said table and carrying it through said ironing and drying means respectively, means for folding a sheet, means for removing said sheet from said carrier and delivering it to said folding means, and means for receiving sheets from said folding means and stacking them.

23. In a machine of the type disclosed in combination, heated elements having substantially flat surfaces for ironing a sheet, heated rolls for drying said sheet, a carrier for carrying a piece to be ironed through a predetermined path, said heated ironing elements and drying rolls being positioned in the path of said carrier element and spaced a substantial distance apart whereby said sheet is partially dried on said carrier during its passage from said ironing element to said drying rolls.

24. In a machine of the type disclosed, in combination, a table for supporting a sheet to be processed, carrier means for lifting said sheet from said table and carrying it thru said processing means, means for folding the sheet, means for removing said sheet from said carrier and delivering it to said folding means.

25. In a machine adapted to fold, without resetting the machine, rectangular sheets of variable dimensions into equal quarters, feeding means including, in combination, a table, a group of parallel lines on the table, the group consisting of pairs whose median lines coincide, a second group of similar parallel lines on the table whose median line lies at right angles to the median of the first group, a carrier for picking up and folding the sheet along one median line, means for processing the folded sheet while on the carrier, means for removing the sheet from the carrier, means to fold the folded sheet at right angles after processing.

JOHN GRIESINGER.